United States Patent [19]

Kuznicki et al.

[11] Patent Number: 5,346,535
[45] Date of Patent: Sep. 13, 1994

[54] USE OF CRYSTALLINE MOLECULAR SIEVES CONTAINING CHARGED OCTAHEDRAL SITES IN REMOVING VOLATILE ORGANIC COMPOUNDS FROM A MIXTURE OF THE SAME

[75] Inventors: Steven M. Kuznicki, Easton, Pa.; Dinh Dang, South Plainfield, N.J.; David T. Hayhurst, Willoughby; Kathleen A. Thrush, Easton, Pa.

[73] Assignee: Engelhard Corporation, Iselin, N.J.

[21] Appl. No.: 749,012

[22] Filed: Aug. 23, 1991

[51] Int. Cl.$^5$ ............................................. B01D 53/04
[52] U.S. Cl. ........................................ 95/96; 95/106; 95/141; 95/142; 95/147
[58] Field of Search ................... 55/25, 26, 28, 68, 75; 95/96–106, 114, 115, 120, 126, 141–148

[56] References Cited

U.S. PATENT DOCUMENTS

| | | | |
|---|---|---|---|
| 3,732,326 | 5/1973 | Chen | 55/75 X |
| 3,844,737 | 10/1974 | Macriss et al. | 55/34 |
| 4,070,164 | 1/1978 | Miwa et al. | 55/26 |
| 4,134,743 | 1/1979 | Macriss et al. | 55/34 |
| 4,197,095 | 4/1980 | White, Jr. et al. | 55/20 |
| 4,247,311 | 1/1981 | Seibert et al. | 55/162 |
| 4,257,885 | 3/1981 | Grose et al. | 55/75 X |
| 4,358,297 | 11/1982 | Eberly, Jr. | 55/75 X |
| 4,455,444 | 6/1984 | Kulprathipanja et al. | 55/75 X |
| 4,455,445 | 6/1984 | Neuzil et al. | 55/75 X |
| 4,701,189 | 10/1987 | Oliker | 55/34 |
| 4,758,253 | 7/1988 | Davidson et al. | 55/75 X |
| 4,783,201 | 11/1988 | Rice et al. | 55/16 |
| 4,783,203 | 11/1988 | Doshi | 55/75 X |
| 4,795,482 | 1/1989 | Gioffre et al. | 55/75 |
| 4,846,852 | 7/1989 | Schweitzer et al. | 55/75 X |
| 4,853,202 | 8/1989 | Kuznicki | 423/326 |
| 4,938,939 | 7/1990 | Kuznicki | 423/326 |

*Primary Examiner*—Robert Spitzer
*Attorney, Agent, or Firm*—Inez L. Moselle

[57] ABSTRACT

Crystalline molecular sieves containing octahedral sites such as the sieves known as ETS-4, ETS-10 and ETAS-10 are used to remove volatile organic compounds from a mixture of the same with moist air at ambient temperature.

7 Claims, 2 Drawing Sheets

USE OF CRYSTALLINE MOLECULAR SIEVES CONTAINING CHARGED OCTAHEDRAL SITES IN REMOVING VOLATILE ORGANIC COMPOUNDS FROM A MIXTURE OF THE SAME

FIELD OF THE INVENTION

This invention relates to the use of unique inorganic molecular sieves of the type containing octahedrally coordinated metal sites, such as octahedrally coordinated titanium, in processes for removing volatile organic compounds (VOC) from wet or moist air. The invention is especially directed to such processes in which organic molecules are absorbed from wet or moist gas streams, especially air, at ambient temperature or temperatures slightly above ambient temperature and are desorbed by heating at relatively low temperature, or by pressure swings or by using a displacing fluid.

BACKGROUND OF THE INVENTION

Adsorbents are employed in a wide variety of applications ranging from drying of bulk industrial gas streams to climate control by dehumidification, adsorptive cooling or heating such as in various heat pump and desiccant cooling schemes as well as selective separation of organic compounds from mixtures of the same with other organic compounds.

Nearly all such commercial processes are cyclic as presently practiced and involve an adsorption stage wherein a component or components is adsorbed from a gas stream, followed by desorption of the adsorbed material or materials to regenerate the adsorbent, which is then recycled into contact with an incoming gas stream for renewed adsorption.

Such processes are well known in the art and are described in numerous technical publications and patents. Typical of such, herein incorporated by reference, are U.S. Pat. Nos. 4,701,189; 3,844,737; 4,134,743; 4,197,095; 4,247,311; 4,783,201; 4,070,164, as well as D. W. Breck, *Zeolite Molecular Sieves*, John Wiley & Sons, Inc., Chapter 8.

A particular difficulty with regard to gaseous separations is encountered when it is desirous to remove organic gases in the presence of water vapor such as moist air. Situations of this type are encountered in the so-called "sick building syndrome" when solvents from construction materials used to build large insulated buildings leach into the air causing potential health hazards and much social and political concern. In addition, there are other and more common causes where organic contamination of air represents a clear problem, including painting operations, cleaning operations or any other operations which involve the use of an organic solvent.

Presently available adsorbents have many disadvantages which limit their effectiveness in separating volatile organic compounds (VOC) from a mixture of the same with moist air.

By way of explanation, presently available adsorptive desiccants are of two general types, namely, classical crystalline zeolitic molecular sieves, such as zeolites Chabazite, A and X and amorphous (noncrystalline) inorganic metal oxides or metal silicates, such as silica gel or certain alumina gels or certain porous forms of carbon. Classical molecular sieves strongly and preferentially bind water by electrostatic interaction with water and the cations inherent to most zeolite structures.

Although classical molecular sieves also bind organic molecules, such binding is weaker than with polar compounds such as water. As a consequence, water rapidly "covers" all the active sites in such zeolites effectively blocking the adsorption of volatile organic compounds.

On the other hand, carbons will bind organics in preference to water. However, the binding is so strong that regeneration is expensive and degradation of the carbon adsorbent usually occurs.

If a balance could be reached where water and volatile organics could both be easily adsorbed and desorbed by the same absorbent, then systems conventionally used for dehumidifying air could be used for removing said volatile organics from moist air.

SUMMARY OF THE INVENTION

Figure 1:
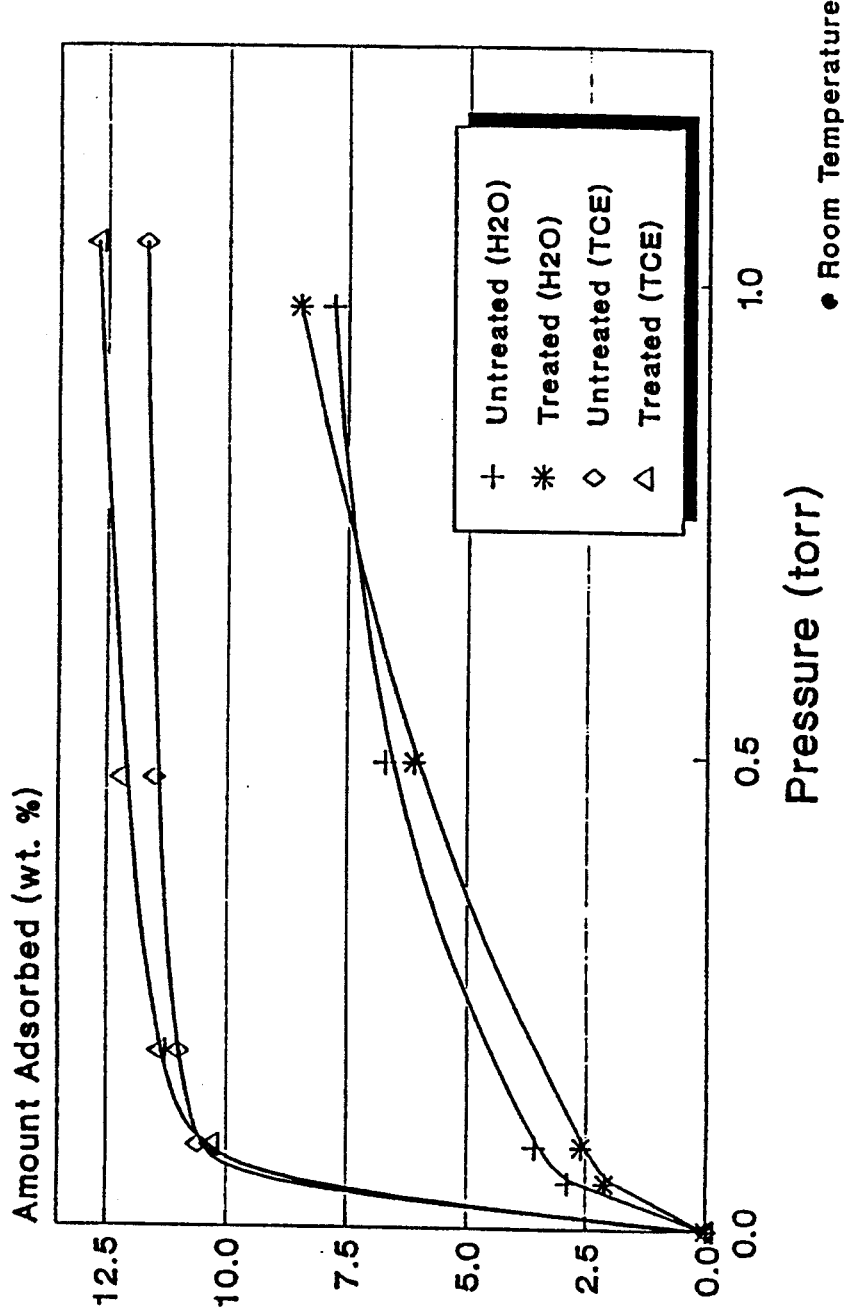
FIG. 1 presents water and trichloroethylene adsorption isotherms by both assynthesized and partial hydrogen exchanged ETS-10 at various pressures.

It has now been found that the unique three-dimensional framework molecular sieves used in practice of the instant invention, hereinafter referred to as "EXS" molecular sieves are effective for the removal of volatile organic compounds (VOC) from a mixture of the same with moist gas streams, especially air. EXS molecular sieves are distinguished from other molecular sieves by possessing octahedrally coordinated active sites in the crystalline structure. These molecular sieves contain electrostatically charged units that are radically different from charged units in conventional tetrahedrally coordinated molecular sieves. As in the case of classical zeolites, active sites represent cations counterbalancing the negative portion of the molecular sieve framework; however, these sites are weaker when induced by octahedral metal oxides than observed for tetrahedral aluminum in classical sieves. Members of the EXS family of sieves include, by way of example, ETS-4 (U.S. Pat. No. 4,938,939), ETS-10 (U.S. Pat. No. 4,853,202), and ETAS-10 (Ser. No. 529,021, filed May 25, 1990), all of which are titanium silicates or titanium aluminum silicates and the disclosure of which is incorporated herein by reference. These sieves exhibit isotherms indicating more active binding of water and VOC than is inherent to the tetrahedral sites of classical zeolite and which may be manipulated and tailored for specific applications by means such as ion-exchange.

PREFERRED EMBODIMENTS OF THE INVENTION

EXS sieves used in the practice of this invention may be employed in the physical form amenable to the specific process in which it is used. This includes fine powders, shaped particles such as fluidizable microspheres, pellets, honeycombs, or in composites supported on substrates such as paper.

This invention can be carried out by employing the same type of cyclic systems used for dehumidification of air, such as thermal swing cycles, pressure swing cycles, as well as the use of another fluid or gas to desorb the water vapor and VOC.

The VOC which can be removed from moist air include aliphatic, aromatic and cyclic organic compounds, particularly hydrocarbons, including halogenated hydrocarbons. Representative VOC include n-paraffins, benzene, toluene, acetone, xylene and trichloroethylene. Because of the small pore size of ETS-4, VOC having molecular dimensions of 3–5 Angstrom units can be removed. ETS-10 and ETAS-10 can be used for VOC having larger molecular dimensions since their pore size is larger. The expression "moist air" is intended to mean air containing significant amounts of water vapor, e.g., greater than 5 mm partial pressure. The following examples will illustrate the best mode for carrying out the invention.

EXAMPLE 1

A sample of as-synthesized ETS-10 powder was activated under vacuum at 300° C. on the McBain-Bakr microbalance system. After cooling, isotherms were collected at 30° C. for water and trichloroethylene TCE, a very common halocarbon solvent. The low pressure regime where competition between the two adsorbates would actually occur in co-adsorption processes is presented in the Figure (where "untreated" refers to the as-synthesized material). These isotherms demonstrate that the binding of TCE is much stronger than water under the conditions tested and that in competitive adsorption, TCE would be expected to be selectively adsorbed over water.

EXAMPLE 2

While Example 1 demonstrated an apparent adsorptive preference for TCE over water by ETS-10, the amount of water typically found in VOC contaminated air massively exceeds the VOC concentration. For an adsorbent to demonstrate significant capacity for the minor component in competitive adsorption, its selectivity towards the minor component must be at least of the order of magnitude of the ratio of the major to minor component. In removing VOCs from wet air, maximum VOC/water selectivity would therefore be desired. In order to enhance the selectivity of ETS-10 adsorbent towards TCE, the material of Example 1 was treated by washing in pH4 solution to facilitate partial ($\sim\frac{2}{3}$) hydrogen exchange. The treated sample was activated and tested in a manner identical to Example 1. The TCE and water isotherms collected are contrasted with those of Example 1 in the Figure (where "treated" refers to said partial hydrogen exchanged material). While the differences at first appear subtle, the slope of the TCE isotherm at very low pressures is significantly enhanced while the concomitant water isotherm is weakened. This leads to the expectation of enhanced TCE over water selectivity by this treatment.

EXAMPLE 3

A sample of granulated partially hydrogenexchanged ETS-10 was subjected to competitive TCE/water adsorption under the harshest possible conditions—trace TCE in liquid water. The granules were prepared as described below.

A paste was prepared by combining 50 g of acid washed ETS-10 with 30 g Ludox HS-40 (40% $SiO_2$) such that the solid composition approximated 80% adsorbent/20% $SiO_2$. The "paste" was dried at 200° C. and the hard cake ground and screened. The 20/50 mesh fraction was employed in this experiment. Fifty (50) ppm of TCE was dissolved in water and flowed through a bed of adsorbent at approximately 7 turnovers per minute. The output stream was subjected to analysis for TCE at regular time intervals. For the first 2 minutes, TCE output was negligible. At 5 minutes, TCE concentration actually exceeded the 50 ppm input. This concentration declined to and leveled off at 50 ppm thereafter.

This example demonstrates several things. The selectivity of TCE/water, even under the harshest conditions, is of the magnitude of $10^5$, more than adequate to remove TCE from wet air. The rise in TCE concentration to above the input level can best be interpreted as a chromatographic effect which not only confirms the selectivity noted above, but indicates that TCE may eventually be displaced, and is therefore strippable from the adsorbent. These are the desired properties of an adsorbent intended to reversibly remove VOCs such as TCE from actual wet air.

EXAMPLE 4

In practice, most absorbents are thermally regenerated, generally by stripping with a hot gas stream. In order for an adsorbent to be applied in a cyclic process, it must be substantially regenerable, preferably under the mildest heating conditions possible.

Figure 2:
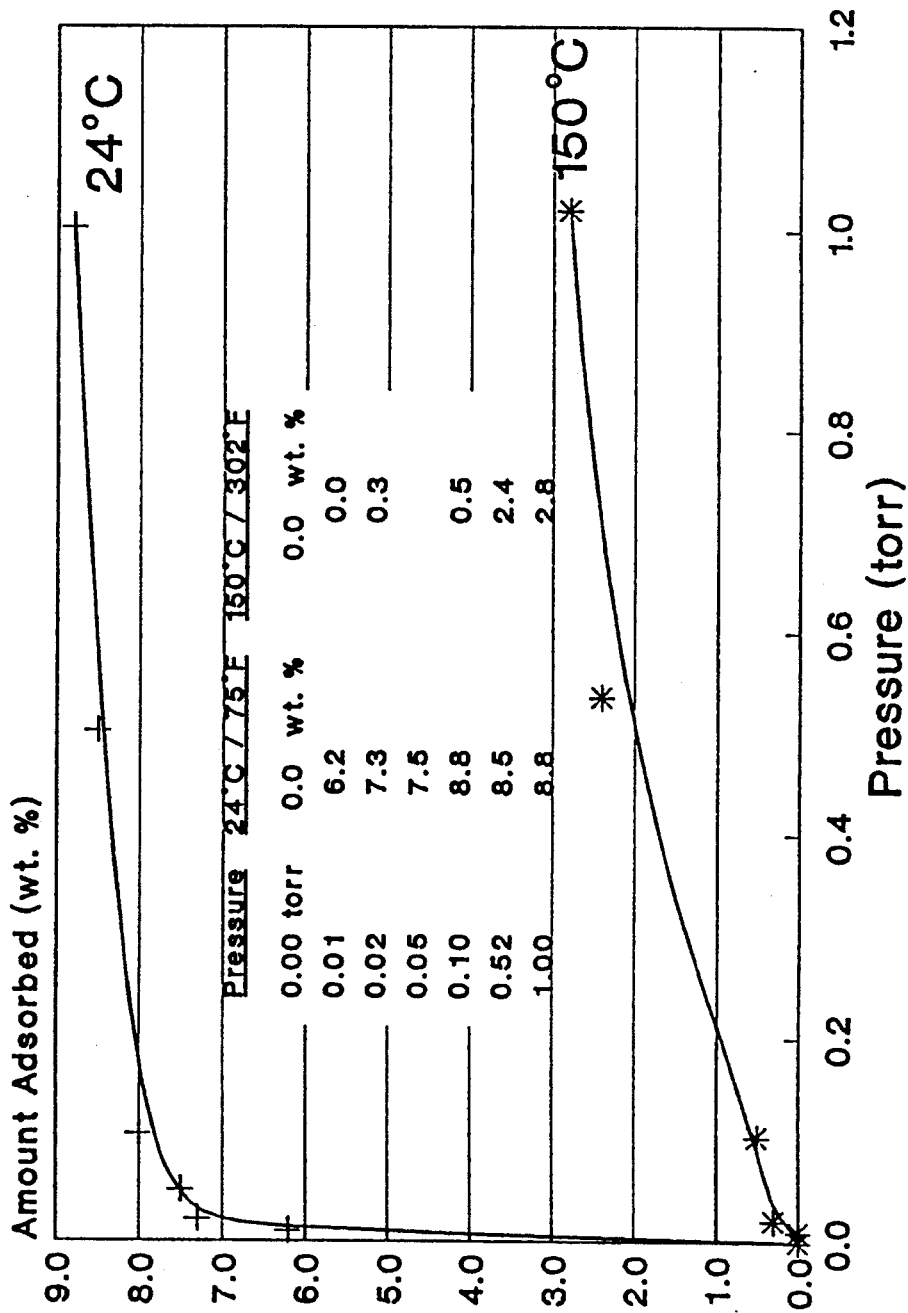
FIG. 2 presents toluene adsorption isotherms and partial hydrogen exchanged ETS-10 at various pressures.

Toluene adsorption isotherms were obtained for an acid washed ETS-10, prepared in the manner of Example 2. 300° F. (150° C.) was chosen as a potential regeneration temperature in that this is a temperature reached easily by a variety of heating techniques. As seen in FIG. 2, toluene is strongly adsorbed even at low partial pressures (concentrations) at ambient temperature but is predominantly desorbed by 300° F. even at much higher partial pressures (concentrations). This not only indicates the ability to apply this type of adsorbent in cyclic VOC removal processes but also indicates the ability to concentrate and potentially recover the test VOC.

What is claimed is:

1. A cyclic process for the removal of volatile organic compounds from a mixture of the same with moist gas stream wherein said mixture is adsorbed at ambient temperature or substantially ambient temperature and is subsequently desorbed which comprises contacting said mixture with a molecular sieve containing octahedrally coordinated active sites and thereafter thermally regenerating said sieve at temperatures up to 150° C.

2. The process of claim 1 wherein said gas stream is air.

3. The process of claim 2 wherein desorption takes place by changing the pressure.

4. The process of claim 3 wherein said process comprises a pressure swing.

5. The process of claim 2 wherein said sieve is ETS-4, ETS-10 and ETAS-10 and chemically modified versions and mixtures thereof.

6. The process of claim 2 wherein said desorption is caused by passing a fluid through said molecular sieve.

7. The process of claim 1 wherein said process comprises a temperature swing.

* * * * *